United States Patent [19]

Oshikoshi et al.

[11] Patent Number: 4,476,497
[45] Date of Patent: Oct. 9, 1984

[54] IMAGE SCANNING AND RECORDING METHOD

[75] Inventors: Yuji Oshikoshi, Tokyo; Toshitaka Agano, Minami-ashigara, both of Japan

[73] Assignee: Fuji Photo Film Co., Ltd., Kanagawa, Japan

[21] Appl. No.: 397,444

[22] Filed: Jul. 12, 1982

[30] Foreign Application Priority Data

Jul. 17, 1981 [JP] Japan ................................. 56-112029

[51] Int. Cl.³ .......................... H04N 5/32; H04N 5/14
[52] U.S. Cl. .................................... 358/298; 358/111; 364/414
[58] Field of Search ............... 358/296, 298, 302, 256, 358/160, 166, 22, 111, 77; 382/6, 54, 48; 364/414, 515

[56] References Cited

U.S. PATENT DOCUMENTS

| 3,757,038 | 9/1973 | Jannery et al. | 358/160 |
| 3,904,816 | 9/1975 | Taudt et al. | 358/256 |
| 3,976,982 | 8/1976 | Eiselen | 358/77 |
| 3,996,421 | 12/1976 | Pruznick et al. | 358/166 |
| 4,080,634 | 3/1978 | Schreiber | 358/298 |
| 4,228,465 | 10/1980 | Stone et al. | 358/111 X |
| 4,306,290 | 12/1981 | Kato et al. | 364/414 |
| 4,342,051 | 7/1982 | Suzuki et al. | 358/298 X |

Primary Examiner—Donald E. McElheny, Jr.
Attorney, Agent, or Firm—Gerald J. Ferguson, Jr.; Joseph J. Baker

[57] ABSTRACT

A method for recording an image by scanning a photosensitive recording medium with a light beam wherein a number of image region are designated on an original image and the image regions are electrically processed using certain image processing conditions which are different for each designated image region in said original image. The image processing conditions comprises different gradation, sharpness, magnification or halftone mode adjustments for each of the designated image regions or any combination of two or more of said image processing conditions.

5 Claims, 3 Drawing Figures

IMAGE SCANNING AND RECORDING METHOD

BACKGROUND OF THE INVENTION

1. Field of the Invention

This invention relates to a method of recording an image on a photosensitive recording medium by scanning the recording medium with a light beam and more particularly relates to an image scanning and recording method in which the conditions for processing the scanned image comprises certain partial changing image gradation, sharpness or the like.

2. Description of the Prior Art

It is common to record an image on a photosensitive recording medium by canning the recording medium in two directions with an intensity-modulated light beam and an electric scanned image signal may be obtained by reading out the respective stored image. Using this image scanning and recording method, it is possible to electrically process the image signal in various ways, such as changing the signals, gradation, sharpness, magnification or halftone mode prior to recording.

For example, for the case where the contrast of the original image is low, an image exhibiting a high contrast can be obtained therefrom by using a gradation-process wherein the electric image signal obtained by reading out the stored image is adjusted so as to increase the image contrast. It is also possible to obtain a special image effect by decreasing the sharpness of the image. For example, when the original scanned image is a radiation image for use in medical diagnosis, it is possible to facilitate observation of the source of a disease from the radiation image by cutting off the high spatial frequency components of the radiation image and reproducing only the low spatial frequency component of the radiation image (namely by lowering the image sharpness). Further, it is also possible to obtain an image suitable for viewing and diagnosising purposes by appropriately changing the magnification or selecting a given dot or line halftone mode.

In the conventional above-mentioned image processing techniques, a predetermined processing of gradation, sharpness, magnification, halftone mode or the like is conducted over the whole original image so as to obtain a processed image in a predetermined manner over the entire area thereof.

However, it is sometimes desired to conduct different processings for different sections of the original image. For example, in the case of a medical X-ray photograph carrying an image of a certain portion of a patients' body, it is sometimes effective to increase the gradation at a predetermined section of the original image and obtain a low-gradation, soft finish, at the remaining section thereof for the purpose of facilitating observation of the source of a desease and for improving the diagnostic efficiency and accuracy thereof. Also, it is sometimes effective for viewing and diagnosis purposes to raise the image sharpness at a given section of the original image and to lower it at the remaining section thereof.

Using the conventional recording method mentioned above, the same processing is applied over the whole area of the original image and, therefore, it is not possible to obtain an image which is partially processed to different degrees at different part, thereof.

SUMMARY OF THE INVENTION

The primary object of the present invention is to provide a method of recording an image on a photosensitive recording medium by scanning the recording medium with a light beam.

Another object of the present invention is to provide an image scanning and recording method for obtaining an image which is partially processed under different image processing conditions.

The specific object of the present invention is to provide an image scanning and recording method in which certain regions of the image to be recorded are designated, and the parts of the image in the designated regions are recorded under different image processing conditions respectively.

The recording method in accordance with the present invention basically comprises: designating a number of image regions on an image to be recorded, processing each designated image region in said image to be recorded under different processing conditions and recording each of the processed designated image regions of said image to be recorded on a photosensitive recording medium.

With the image recording method in accordance with the present invention, it is possible to process various regions of an image under different conditions and record the image thus processed. Accordingly, the method in accordance with the present invention can provide various image records useful for various purposes. For example, for the case where regions A1 and A2 represent photographs and region A3 comprises characters, (e.g. when the original is an article with photographs in a magazine or a newspaper), it is possible to convert the regions A1 and A2 into dot photographs and record the characters in the region A3 by changing only the magnification without converting them into dot images. In this way, it is possible to record the regions A1 and A2 as easy-to-see medium tone photographs and record the characters in the region A3 as in the original article without deforming their forms.

Furthermore, when the region A2 is a face of a person, it is possible to lower the sharpness thereof and increase the sharpness of the region outside the region A2 so as to obtain an aesthetically satisfactory photograph.

DESCRIPTION OF THE PREFERRED EMBODIMENTS

The present invention will hereinbelow be described in further detail with reference to the accompanying drawings.

Figure 1:
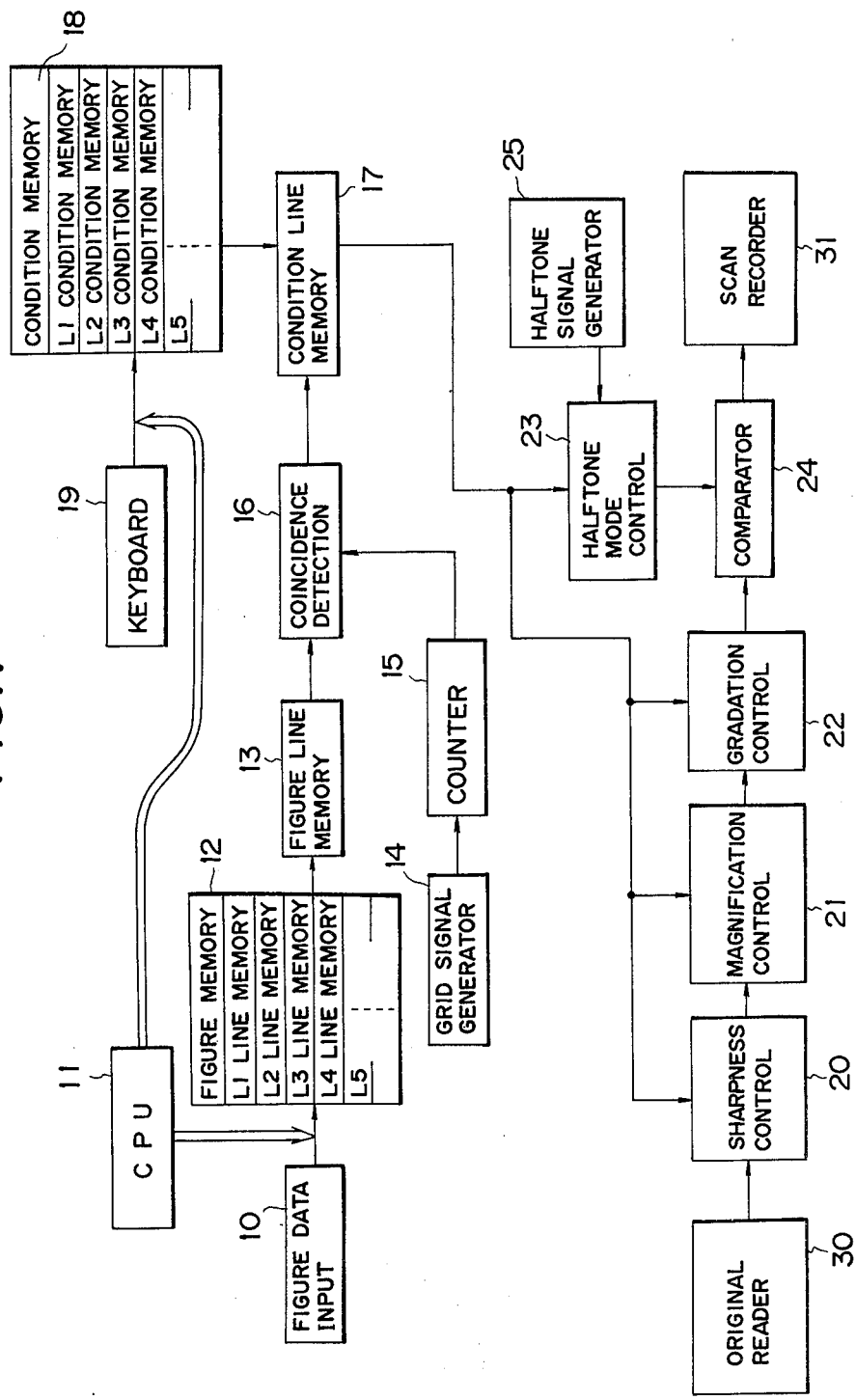
FIG. 1 is a flow diagram showing the scanning and recording system for carrying out the image scanning and recording method in accordance with the present invention.
Figure 2:
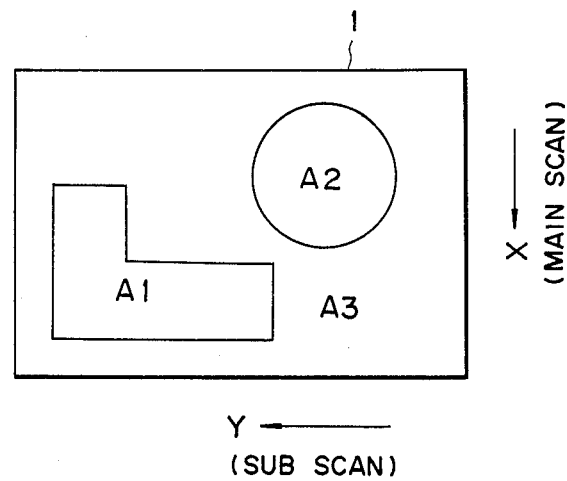
FIG. 2 is an elevational view showing a number of image regions designated in accordance with the present invention.

The method in which the image regions are designated as shown in FIG. 2 in accordance with the present invention is described below with reference to the flow diagram shown in FIG. 1.

Referring to FIG. 2, regions A1 and A2 in an image 1 are designated and recorded under processing conditions different from each other as well as from the remaining section A3 of the image 1. Different gradation, sharpness, magnification and halftone mode are employed in processing the different designated regions as shown in Table 1.

TABLE 1

| Image region | Condition mode | Gradation | Sharpness | Magnification | Halftone mode |
| --- | --- | --- | --- | --- | --- |
| A1 | a1 | Standard (K0) | Standard (S0) | 1.21 | Dot |
| A2 | a2 | +1 (K1) | +1 (S1) | 1.15 | Dot |
| A3 | a3 | Standard (K0) | Standard (S0) | 0.78 | Line |

First, the regions as shown in FIG. 2 are drawn on a layout sheet. The regions thus drawn are then read out by a figure data input unit (digitizer) 10 shown in FIG. 1 to obtain a figure signal. In the figure data input unit 10, the figure data is inputed in terms of the X and Y coordinate values designated to the figure drawn on the layout sheet by use of an electric pen. In this case, a pitch p1 for the X and Y coordinates is set to integral multiples of a scanning line pitch p2 (both in the main and subsidiary scanning directions) in the scanning of the original figure signal for reading out the image. Namely, the following equation holds:

$$p1 = Np2$$

in which N is an integer. For example, when the image scanning pitch p2 is 50 μm, for N=2, the pitch p1 for the X and Y coordinates in the digitizer 10 is set to 100 μm. The descriptions below assumes that N=1, i.e. p1=p2.

Figure 3:
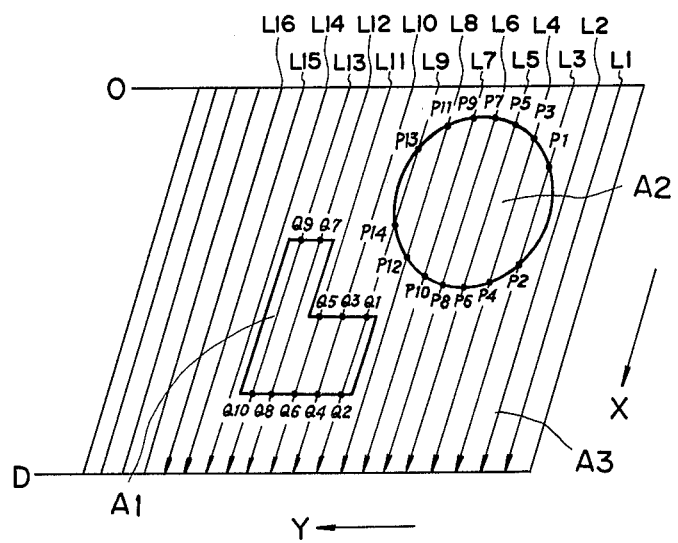
FIG. 3 is a perspective view showing the positions of the designated image regions with respect to the scanning lines.

Then, the lines and strings of the coordinate values of the inputed figure to the figure data input unit 10 are stored in a figure memory 12 with the aid of a microcomputer (CPU) 11. The figure memory 12 has line memories for respective scanning lines. Thus an L1 line memory is used for the first line, an L2 line memory is used for the second line, and so on. In this way, the coordinate values of the figure are inputed to the memory of the figure memory 12 from the first to fourteenth lines. As shown in FIG. 3, the contour of the region A2 is expressed by points P1 to P14, and that of the region A1 by points Q1 to Q10. In this case, the figure data are inputed and stored as shown in Table 2.

TABLE 2

| Line | String input |
| --- | --- |
| L1, L2 | None (All signals are low.) |
| L3 | P1, P2 (Only the P1 and P2 signals are high.) |
| L4 | P3, P4 (High) |
| L5 | P5, P6 (High) |
| L6 | P7, P8 (High) |
| L7 | P9, P10 (High) |
| L8 | P11, P12 (High) |
| L9 | P13, P14, Q1, Q2 (High) |
| L10 | Q3, Q4 (High) |
| L11 | Q5, Q6 (High) |
| L12 | Q7, Q8 (High) |
| L13 | Q9, Q10 (High) |
| L14 | None |

In this way, the coordinate values, i.e. the line and string data are inputed and stored in respective line memories in the figure memory 12, and then sequentially inputed to a figure line memory 13.

At the same time, grid signal pulses are generated by a grid signal generator 14 in synchronization with the main scanning of the original signal. They are then sent to a counter 15 and counted. For example, as for the third line L3, when P1 pulses have been counted, the value stored in the figure line memory 13 coincides with the count in the counter 15. This state is detected by a coincidence detecting circuit 16, which in turn sends a trigger pulse to a condition line memory 17.

The trigger pulse sent to the condition line memory 17 indicates that there is a contour constituting the figure. Upon receiving the trigger pulse from the coincidence detecting circuit 16, the condition line memory 17 generates a control signal to change the conditions of that contour.

The condition line memory 17 stores in advance the information for the setting conditions sent from condition memories for respective lines in a condition memory 18. The information for the setting conditions for respective lines can be inputed to the condition memory 18 from a keyboard 19 via the CPU 11. The setting conditions may include for example the gradation, sharpness, magnification, halftone mode as well as other adjustments. As shown in Table 1, the condition of gradation may be set to the standard (K0) or a compensation value (+1, −1 and so on) with respect to the standard (K0). The condition of sharpness may be set to the standard (S0) or a compensation value (+1, −1 and so on). As for the magnification, a magnification value is inputed. The halftone mode may be set for example to i) dot mode or line mode, ii) halftone positive or halftone negative, iii) erect image or reverse image, or iv) number of screen lines i.e. halftone pitch.

For example, various combinations of processing conditions are determined for condition modes a1, a2 and a3, and designated for respective image regions A1, A2 and A3 as shown in Table 1. These condition modes a1, a2 and a3 are stored in advance in the condition memory 18.

More specifically, the condition mode a3 is set for all positions on the first and second lines L1, L2 shown in FIG. 3. On the third line L3, the condition mode a3 is set for the section between the point O and point P1, the condition mode a2 for the section between the points P1 and P2, and the condition mode a3 for the section between points P3 and D. These settings can be tabulated as shown in Table 3.

TABLE 3

| Line | Setting of condition mode |
| --- | --- |
| L1, L2 | a3 |
| L3 | O(a3)P1(a2)P2(a3)D |
| L4 | O(a3)P3(a2)P4(a3)D |
| L5 | O(a3)P5(a2)P6(a3)D |
| L6 | O(a3)P7(a2)P8(a3)D |
| L7 | O(a3)P9(a2)P10(a3)D |
| L8 | O(a3)P11(a2)P12(a3)D |
| L9 | O(a3)P13(a2)P14(a3)Q1(a1)Q2(a3)D |
| L10 | O(a3)Q3(a1)Q4(a3)D |
| L11 | O(a3)Q5(a1)Q6(a3)D |
| L12 | O(a3)Q7(a1)Q8(a3)D |
| L13 | O(a3)Q9(a1)Q10(a3)D |
| L14 | a3 |
| . | . |
| . | . |
| . | . |

The condition modes set for respective scanning lines as described above are stored in the condition line memory 17. Each time a trigger pulse is fed from the coincidence detecting circuit 16 to the condition line memory 17, the condition mode changes for each scanning line as shown in Table 3. For example, in the case of the third line L3, the three sections thereof are set to the condition modes a3, a2 and a3 respectively, and these condition modes are stored in the condition line memory 17. When the trigger pulse is sent from the coincidence detecting circuit 16 to the condition line memory 17, the condition mode changes in the order of a3, a2 and a3, and the control signals for each condition mode are inputed to condition controllers 20, 21, 22 and 23. The sharpness controller 20, the magnification controller 21 and the gradation controller 22 are connected in series with the output terminal of an original reader 30. The halftone mode controller 23 is connected to the first input terminal of a comparator 24 the second input of which is connected to the output terminal of the gradation controller 22. The halftone mode controller 23 also receives the halftone signal fed from a halftone signal generator 25. The comparator 24 receives the halftone signal fed from the halftone signal generator 25 via the halftone mode controller 23, and compares it with the signal fed from the original reader 30 via controllers 20, 21 and 22. On the basis of this comparison, the comparator 24 outputs a recording signal, which is to be recorded on a photosensitive recording medium, to a light beam scan recorder 31 for recording the image on the photosensitive recording medium.

As described above, the designated image regions A1 and A2 can be processed under conditions which are different from each other and also from the remaining region of the image. In this way, an image in which different regions thereof are processed in different ways or to different degrees can be recorded on a photosensitive recording medium.

We claim:

1. An image scanning and recording method for recording an image by scanning a photosensitive recording medium with a light beam where said image to be recorded comprises a single X-ray photograph carrying an image of a certain portion of a patient's body, which comprises:

designating a plurality of different image regions on said X-ray photograph where each of said image regions comprises an area substantially greater than one pixel and where said designated image regions each correspond to a predetermined section of said certain portion of the patient's body;

preprocessing each designated image region to establish a predetermined image processing condition for that region;

scanning the preprocessed X-ray photograph to obtain an electric scanned image signal;

processing each said designated image region in said electric scanned image signal in accordance with the said predetermined image processing condition established for that region; and recording each of the processed designated image regions in said electric scanned image signal on a photosensitive recording medium.

2. A method as defined in claim 1 wherein said image processing condition comprises adjusting the gradation of each image region to be recorded.

3. A method as defined in claim 1 wherein said image processing condition comprises adjusting the sharpness of each image region to be recorded.

4. A method as defined in claim 1 wherein said image processing condition comprises adjusting the magnification of each image region to be recorded.

5. A method as defined in claim 1 wherein said image processing condition comprises adjusting the halftone mode of each image region to be recorded.

* * * * *